US009503521B2

(12) United States Patent
Poledna

(10) Patent No.: US 9,503,521 B2
(45) Date of Patent: Nov. 22, 2016

(54) METHOD AND SWITCHING UNIT FOR THE RELIABLE SWITCHING OF SYNCHRONIZATION OF MESSAGES

(71) Applicant: FTS Computertechnik GmbH, Vienna (AT)

(72) Inventor: Stefan Poledna, Klosterneuburg (AT)

(73) Assignee: FTS Computertechnik GmbH, Vienna (AT)

( * ) Notice: Subject to any disclaimer, the term of this patent is extended or adjusted under 35 U.S.C. 154(b) by 91 days.

(21) Appl. No.: 14/391,162

(22) PCT Filed: Apr. 9, 2013

(86) PCT No.: PCT/AT2013/050084
§ 371 (c)(1),
(2) Date: Oct. 7, 2014

(87) PCT Pub. No.: WO2013/152379
PCT Pub. Date: Oct. 17, 2013

(65) Prior Publication Data

US 2015/0063362 A1 Mar. 5, 2015

(30) Foreign Application Priority Data

Apr. 11, 2012 (AT) .................................. A 433/2012

(51) Int. Cl.
*H04L 12/28* (2006.01)
*H04L 12/56* (2006.01)
(Continued)

(52) U.S. Cl.
CPC ....... *H04L 67/1095* (2013.01); *G06F 11/1687* (2013.01); *H04J 3/0673* (2013.01);
(Continued)

(58) Field of Classification Search
CPC ................. H04L 67/1095; H04L 45/44; H04L 49/35; H04L 49/552; G06F 11/1641;
(Continued)

(56) References Cited

U.S. PATENT DOCUMENTS 4,417,334 A 11/1983 Gunderson et al.
4,551,833 A 11/1985 Turner
(Continued)

FOREIGN PATENT DOCUMENTS

DE 4432061 C1 12/1995
EP 108555 A3 8/1984
(Continued)

OTHER PUBLICATIONS

International Search Report and Written Opinion for International Application PCT/AT2013/050084, completed Jul. 5, 2013, 14 pgs.
(Continued)

*Primary Examiner* — Lonnie Sweet
(74) *Attorney, Agent, or Firm* — KPPB LLP

(57) ABSTRACT

The invention relates to a method for the reliable switching of synchronization messages in a distributed computer system consisting of a number of node computers, wherein the management of a transparent clock conforming to IEEE Standard 1588 is supported, wherein a switching unit consists of four separate FCUs, specifically an input system EIN, two independent switching systems VER1 and VER2, and an output system AUS, and wherein a message arriving at EIN from a transmitting node computer is forwarded immediately in unmodified form from EIN directly to the two independent switching systems VER1 and VER2, and wherein VER1 provides the event of the arrival of the message with a timestamp, analyses the message and switches said message to (an) output port(s) associated with
(Continued)

Figure 1:
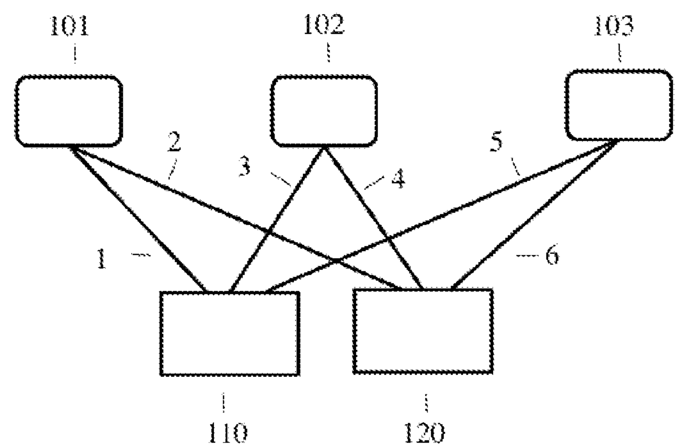

an address field of the message, and wherein VER1 opens the message and modifies a TIC field within the message in order to determine the delay period of the message in VER1, and wherein VER1 closes the message again by re-calculating a CRC field of the modified message and forwarding the closed message to AUS, and wherein VER2 provides the event of the arrival of the message with a timestamp, analyses the message and switches said message to the output port(s) associated with the address field of the message, and wherein VER2 opens the message and modifies the TIC field within the message in order to determine the delay period of the message in VER2, and wherein VER2 closes the message again by re-calculating the CRC field of the modified message and forwarding the closed message to AUS, and wherein AUS checks whether the content of the message delivered from VER1 matches the content of the message delivered from VER2, and wherein AUS checks whether the interval between the moment of receipt of the message delivered from VER1 and the moment of receipt of the message delivered from VER2 is smaller than a first interval determined a priori, referred to hereinafter as the interval_1, and whether the absolute value of the difference of the delay values stored in the two TIC fields is smaller than a second interval known a priori, referred to hereinafter as the interval_2, and wherein, in the case that one of these checks is negative, AUS interrupts the transmission of the message that is outbound via the addressed output ports or changes the outbound message in such a way that each message receiver identifies the incoming message as faulty.

15 Claims, 1 Drawing Sheet

(51) Int. Cl.

| | |
|---|---|
| ***H04L 29/08*** | (2006.01) |
| ***H04J 3/06*** | (2006.01) |
| ***H04L 12/931*** | (2013.01) |
| ***H04L 12/939*** | (2013.01) |
| ***H04L 12/721*** | (2013.01) |
| *G06F 11/16* | (2006.01) |

(52) U.S. Cl.
CPC ............... *H04L 45/44* (2013.01); *H04L 49/35* (2013.01); *H04L 49/552* (2013.01); *G06F 11/1641* (2013.01); *G06F 11/1695* (2013.01); *H04J 3/0667* (2013.01)

(58) Field of Classification Search
CPC ................. G06F 11/1695; H04J 3/0673; H04J 3/0667
See application file for complete search history.

(56) References Cited

U.S. PATENT DOCUMENTS

| | | | | |
|---|---|---|---|---|
| 5,694,542 | A | 12/1997 | Kopetz | |
| 7,349,512 | B2 | 3/2008 | Rausch et al. | |
| 7,633,870 | B2 * | 12/2009 | Elliot | H04J 3/0673 370/235 |
| 7,839,868 | B2 | 11/2010 | Kopetz | |
| 7,912,094 | B2 | 3/2011 | Hall et al. | |
| 8,089,991 | B2 | 1/2012 | Ungermann et al. | |
| 8,428,045 | B2 * | 4/2013 | Gelter | H04L 49/90 370/350 |
| 2006/0245454 | A1 * | 11/2006 | Balasubramanian | H04L 12/4625 370/509 |
| 2008/0175275 | A1 * | 7/2008 | Garner | H04J 3/0667 370/503 |
| 2011/0173347 | A1 | 7/2011 | Steiner et al. | |
| 2012/0224492 | A1 * | 9/2012 | Kitayama | H04L 12/4035 370/242 |
| 2013/0170390 | A1 * | 7/2013 | Umayabashi | H04L 43/0852 370/252 |

FOREIGN PATENT DOCUMENTS

| | | | |
|---|---|---|---|
| EP | 1717978 | A1 | 11/2006 |
| WO | 2011123877 | A1 | 10/2011 |

OTHER PUBLICATIONS

Eidson et al., "Spider Transparent Clock", ISPCS 2008, International IEEE Symposium on Precision Clock Synchronization for Measurement, Control and Communication, Sep. 2008. 5 pgs.
SAE Standard of TT Ethernet, Retrieved from: http://standards.sae.org/as6802/, Published Nov. 1, 2011.
IEEE 1588 Standard for a Precision Clock Synchronization Protocol for Network Measurement and Control Systems, http://www.ieee1588.com, 2002.
Kopetz, H., "Real-Time Systems, Design Principles for Distributed Embedded Applications", Springer publishing house, 2011.

* cited by examiner

METHOD AND SWITCHING UNIT FOR THE RELIABLE SWITCHING OF SYNCHRONIZATION OF MESSAGES

The invention relates to a method for the reliable switching of synchronisation messages in a distributed computer system consisting of a number of node computers, wherein the management of a transparent clock conforming to IEEE Standard 1588 is supported.

The invention also relates to an apparatus for carrying out such a method.

The present invention lies in the field of computer technology. The invention describes an innovative method for reliably distributing the synchronisation messages generated by a master clock, said messages conforming to SAE Standard AS6802 of TT Ethernet and IEEE Standard 1588, such that a physical global time base can be established in a real-time system based on Ethernet.

In a distributed real-time system, in which a number of computers control a physical process, it is advantageous when all computers have a common global time base [8]. Such a global time base can be established by the receipt of periodic synchronisation messages, which are transmitted by a fault-tolerant master clock. A synchronisation message, in the data field thereof, contains the moment in time of the transmission by the master clock. At the receiver of a synchronisation message, the length of time by which the synchronisation message was delayed in the communication system before it arrived at the receiver must be precisely determined in order to be able to correct the time error at the receiver caused by the delay. In the SAE Standard AS6802 of TT Ethernet and in IEEE Standard 1588 [10], a field (time-interval correction field—TIC field) is provided for this purpose in the data field of an Ethernet message and has to be modified by a compliant switching unit for transparent clocks in order to determine the sum of the delay periods of a message in the switching units. When a fault occurs during the modification of the TIC field of a synchronisation message, a faulty synchronisation message may thus be output from the switching unit.

The object of the invention is to provide a reliable switching of synchronisation messages within a distributed computer system consisting of a number of node computers, wherein the management of a transparent clock conforming to IEEE Standard 1588 is supported.

This object is achieved with a method as mentioned in the introduction in that, in accordance with the invention, a switching unit consists of four separate FCUs, specifically an input system EIN, two independent switching systems VER1 and VER2, and an output system AUS, and wherein a message arriving at EIN from a transmitting node computer is forwarded immediately in unmodified form from EIN directly to the two independent switching systems VER1 and VER2, and wherein VER1 provides the event of the arrival of the message with a timestamp, analyses the message and switches said message to (an) output port(s) associated with an address field of the message, and wherein VER1 opens the message and modifies a TIC field within the message in order to determine the delay period of the message in VER1, and wherein VER1 closes the message again by re-calculating a CRC field of the modified message and forwarding the closed message to AUS, and wherein VER2 provides the event of the arrival of the message with a timestamp, analyses the message and switches said message to the output port(s) associated with the address field of the message, and wherein VER2 opens the message and modifies the TIC field within the message in order to determine the delay period of the message in VER2, and wherein VER2 closes the message again by re-calculating the CRC field of the modified message and forwarding the closed message to AUS, and wherein AUS checks whether the content of the message delivered from VER1 matches the content of the message delivered from VER2, and wherein AUS checks whether the interval between the moment of receipt of the message delivered from VER1 and the moment of receipt of the message delivered from VER2 is smaller than a first interval determined a priori, referred to hereinafter as the interval_1, and whether the absolute value of the difference of the delay values stored in the two TIC fields is smaller than a second interval known a priori, referred to hereinafter as the interval_2, and wherein, in the case that one of these checks is negative, AUS interrupts the transmission of the message that is outbound via the addressed output ports or changes the outbound message in such a way that each message receiver identifies the incoming message as faulty.

The present invention discloses a method for establishing a switching unit for Ethernet synchronisation messages so as to be able to identify a synchronisation message fault occurring during the switching process. Either correct messages or no messages or messages identifiable as faulty are sent out by such a reliable switching unit. Such a reliable switching unit is referred to as fail-silent. With use of two fail-silent switching units working in parallel, a fault can not only be identified, but also tolerated.

The terms used in this document will be explained in greater detail hereinafter. An Ethernet message contains a header, a data field and a redundant CRC field. In a correct closed message, the CRC field is consistent with the content of the message. A message is open when no consistent CRC field exists. When a modification is to be made in the data field of a message, the message must therefore first be opened. As the message is opened, it is checked whether the content of the closed message is consistent with the CRC field. When this is not the case, the message is rejected. After carrying out the modification in the data field of the open message, the message must be closed again, that is to say a new consistent CRC field has to be calculated before the message can be sent further. When a modification is made in an open message, a transient fault (for example an SEU (single event upset) due to the natural cosmic radiation) occurring during the modification may induce a fault in the message, which also remains following closure of the message.

In the field of computer reliability, the term "fault-containment unit" (FCU) has central significance [8, p. 136]. An FCU is understood to be an encapsulated sub-system, wherein the immediate effects of a fault cause are limited to this sub-system.

With the switching of data by means of a switching unit, a distinction is made between the store and forward and the cut through method, Whereas in the store and forward method the complete message is stored in the switching unit, a message in the cut through method is forwarded immediately, without storage of the entire message in the switching unit.

The core of the present invention lies in establishing a reliable switching unit for IEEE 1588 synchronisation messages from the following four FCUs: an input system EIN, two independent switching systems VER1 and VER2, and an output system AUS.

A closed synchronisation message arriving at EIN is forwarded from EIN to the two independent FCUs VER1 and VER2 in an unmodified and closed manner. The FCU VER1 opens the message, modifies the TIC field (which specifies the delay period of the message), and closes the message before said message is forwarded to the output system AUS. The FCU VER2 carries out the same processing steps as the FCU VER1. The output system AUS checks whether the content of the closed messages obtained by VER1 and VER2 matches and transmits the message to the designated receivers. If the check of the outbound message identifies a fault, the CRC field of the outbound message is modified in such a way that the receiver identifies the message as faulty. Since the physical time is an analogue variable, it cannot be assumed that the delay periods determined by VER1 and VER2 are identical at digital bit level. It is assumed that the delay periods match when the values differ by less than an interval known a priori. The fields in the two messages, which are not modified by VER1 and VER2, have to be bit-identical. Due to the possible different bit patterns in the TIC fields, the CRC fields of correct messages may also be different. The proposed establishment of the switching unit ensures that any physical individual fault occurring during the switching in one of the four FCUs is identified.

The significant innovation of the present invention lies (1) in the seamless integration of a reliable clock synchronisation into the standardised Ethernet environment, without having to interfere with the existing Ethernet or TTEthernet [9] or the IEEE 1588 clock synchronisation [7] standards, and (2) in the creation of a fail-silent Ethernet Switch, which ensures the required partitioning in distributed safety-relevant real-time systems, even in the event of a fault.

All previously known methods for reliable clock synchronisation are based on solutions incompatible with the Ethernet Standard. For example, Hall [5] deals with the problem of clock synchronisation in a braided ring, which is a proprietary reliable communication system. TTP [2] and FlexRay [4] do not present Ethernet-compliant solutions for fault-tolerant clock synchronisation, and said solutions cannot be transferred to the Ethernet environment. In the method proposed by Ungermann [6] for clock synchronisation, the problem of fault detection and fault tolerance is not mentioned. The method for identifying faults by comparison of the results of replicated FCUs has been known for more than twenty years (for example see Gunderson [1]) and is to be considered part of the prior art [8 p. 156].

The present invention discloses an innovative method and an apparatus for the reliable switching of synchronisation messages conforming to SAE Standard AS6802 of TT Ethernet and IEEE Standard 1588 for clock synchronisation. In accordance with the invention, the switching unit is constructed from four fault-containment units, wherein the non-replicated FCUs process only the message closed by the CRC polynomial, whereas the open message is processed by two replicated FCUs. Due to this construction of the switching unit, it is ensured that any physical individual fault occurring during the switching process can be identified. A fault-tolerant system can be constructed by the arrangement of two switching units operating in this way.

The above-mentioned object is also achieved with an apparatus, in particular with a switching unit for carrying out such a method or for use in such a method.

In one embodiment of the apparatus, the four sub-systems EIN, VER1, VER2 and AUS are provided in different chips.

In another embodiment, the four sub-systems EIN, VER1, VER2 and AUS are provided in two identical chips, wherein the replicated FCUs are synchronised at hardware level.

The four sub-systems EIN, VER1, VER2, and AUS may also be provided in an ASIC, or the four sub-systems EIN, VER1, VER2, and AUS may also be provided in an FPGA.

Further advantageous embodiments of the invention are described as follows and can be provided additionally, alternatively or in any combination with one another. Here, it may be that the messages are processed in the FCU EIN and the FCU AUS in accordance with the cut through method;

the processing in VER1 and VER2 is displaced over time by one or more cycles;

the presentation of the data in VER1 and VER2 is different;

both in VER1 and in VER2, the configuration data for the time-controlled transport of messages is stored redundantly;

the data stored in VER1 and VER2 is secured with fault-identifying codes;

the data stored in VER1 and VER2 is stored with fault-correcting codes;

the configuration data is loaded via a cryptographically secured protocol;

the processing in VER1 and VER2 is driven by the same clock.

Figure 2:
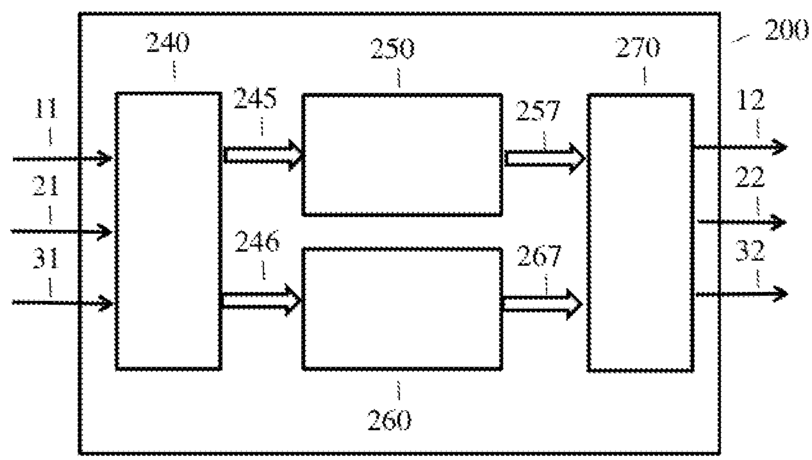

The present invention will be explained in greater detail on the basis of the drawing, in which FIG. 1 shows a distributed system with three node computers and two switching units, and FIG. 2 shows the inner structure of a switching unit.

The following specific example concerns a possible embodiment of the invention.

FIG. 1 shows a distributed system with three node computers 101, 102 and 103 and two switching units 110 and 120. The switching unit 110 is connected to the corresponding node computers via the bidirectional communication channels 1, 2 and 3, and the switching unit 120 is connected to the corresponding node computers via the bidirectional communication channels 4, 5 and 6. Two of the three node computers, for example the node computers 101 and 102, perform the function of a time master and periodically send out fail-silent Ethernet-compatible synchronisation messages, which, in the data field of the message, besides the time of transmission, also contain a TIC field in accordance with SAE Standard AS6802 of TT Ethernet and/or IEEE 1588 Standard (transparent clock), said TIC field specifying the delay of the message in the communication system between the transmitter and receiver. In accordance with the invention, the node calculators communicate with a number of switching units via a network.

FIG. 2 shows the inner structure of the switching unit 110. In FIG. 2, the three bidirectional communication channels 1, 2 and 3 of 110 (FIG. 1) are cleaved in each case into two unidirectional communication channels. The communication channel 11 thus constitutes the input channel 1 to the switching unit, and the communication channel 12 thus constitutes the output channel 1 from the switching unit. Accordingly, 21 constitutes the input channel from 2, and 22 constitutes the output channel from channel 2, and 31 constitutes the input channel from 3, and 32 constitutes the output channel from channel 3 from FIG. 1. In the switching unit 110, 4 FCUs are located. These are the input system EIN 240, the switching systems VER1 250 and VER2 260, and the output system 270. The input system EIN 240 is connected via the communication channel 245 to the switching systems VER1 250 and via the communication channel 246 to the switching systems VER1 260. The switching system VER1 250 is connected via the output channel 257 to the output system AUS 270, and the switching system VER2

260 is connected to said output system via the output channel 267. The inner communication channels 245, 246, 257 and 267, which are to be found within the switching unit 110, are configured such that they demonstrate deterministic (see [8] p. 125) behaviour, even at high load—that is to say messages arrive simultaneously over all three input channels 11, 21 and 31.

A closed synchronisation message, which enters over one of the input channels, for example the channel 11, is forwarded from the input system EIN 240, without being opened, in the cut through method as quickly as technically possible via the channels 245 and 246 to the two independent FCUs VER1 250 and VER2 260. The FCU 250 detects the moment of arrival of the message and checks the consistency between the content and the CRC of the closed message. If the contents are inconsistent, the message is rejected. If the contents are consistent, the message is opened, the required switching is performed, and the TIC field, which specifies the delay of the message between transmitter and receiver, is brought to the new state in accordance with IEEE 1588 Standard. The message is then closed by the FCU 250 by calculating the new CRC. The message, which is now closed, is forwarded via the channel 257 to the FCU AUS 270 for immediate output to the addressed receiver. The FCU AUS 270 detects the moment of arrival of the message from the FCU 250. The FCU VER2 260 performs the same processing steps as the FCU VER1 250, parallel to FCU 250. Since both FCUs VER1 250 and VER2 260 carry out the same processing steps practically simultaneously, the two outbound messages, in the fault-free case, arrive at AUS 270 within an interval_1 determined a priori. When AUS determines that the absolute value of the difference of the times of the start of the receipt of the outbound messages from VER1 250 and VER2 260 is within the interval_1, AUS 270 thus starts immediately with the transmission of the message to the designated receiver in the cut through method. As soon as the TIC fields of the two messages from VER1 250 and VER2 260 arrive at AUS 270, AUS 270 checks whether the two TIC fields match. The TIC fields match when the absolute value of the difference of the values in the two TIC fields is smaller than interval_2. The length of interval_1 and of interval_2 is determined by the digitalisation fault of the time presentation and the different processing periods in the FCUs VER1 250 and VER2 260 caused by the different oscillator frequencies in the FCUs VER1 250 and VER2 260. When the TIC fields do not match, that is to say a fault has been discovered, AUS 270 interrupts the current transmission or changes the CRC field of the outbound message, such that each receiver can identify the message as faulty. AUS 270 then sends a fault message, in which the reason for the interruption is documented, to a monitor computer.

In accordance with the definition of an FCU, it is assumed that a fault occurring in one of the 4 FCUs does not have any direct effects on the other three FCUs. When a fault occurs in one of the four FCUs 240, 250, 260 or 270 of the switching unit 110 during the switching, the fault is thus identified as follows. In the FCUs 240 and 270, only closed messages are processed. A fault in a closed message is identified by checking the message by means of the CRC field contained in the message. When a fault occurs during the processing of the open message by the FCU VER1 250 or the FCU VER2 260, the FCU AUS 270 thus identifies the fault by comparing the messages arriving from the two independent FCUs 250 and 260.

In order to prevent the messages from being temporarily stored in the FCU EIN and the FCU AUS for different lengths of time in the case of a fault, the messages are processed in the FCU EIN and the FCU AUS by the cut through method. A constant known delay time in these two FCUs is thus ensured as a result of the design.

In order to reduce the likelihood that the same fault cause (for example an interruption in the power supply or a lightning strike) induces the same faults in the FCUs 250 and 260, the processing of the messages in the FCUs 250 and 260 can be shifted by a number of cycles, and a different presentation of the information in the FCUs 250 and 260 can be selected.

When the messages are to be switched in accordance with the TTEthernet method (SAE Standard AS6802 of TT Ethernet), configuration data must be stored in the FCU 250 and the FCU 260. In accordance with the invention, this configuration data in the FCU 250 and the FCU 260 is coded in a fault-identifying or fault-correcting manner, such that the consequences of a memory fault can be identified or corrected. Alternatively, the configuration data in FCU 250 and FCU 260 can be stored redundantly. The configuration data is loaded into the FCU 250 and the FCU 260 by means of cryptographically secured transfer protocols [8, p. 141].

The described method for switching synchronisation messages can be implemented differently. In order to optimise the fault containment property, the implementation can be performed on four different chips, such that each FCU is provided in a dedicated chip with dedicated clock.

It is also possible to provide the described method in two identical chips, wherein each of the two chips contains the FCUs EIN, VER and AUS and the replicated FCUs each function in a synchronised manner.

In a further implementation variant, all four FCUs are arranged in a single ASIC or a single FPGA chip. When only a single chip is used, the cycles may then be derived from a single clock or from a number of clocks. The duration of the previously introduced intervals interval_1 and interval_2 are dependent on the selected implementation strategy.

CITED LITERATURE

[1] U.S. Pat. No. 4,417,334 Gunderson et al. Data processing system having dual-channel system bus. Granted Nov. 22, 1983.

[2] U.S. Pat. No. 5,694,542 Kopetz, H. Time-triggered communication control unit and communication method. Granted Dec. 2, 1997.

[3] U.S. Pat. No. 7,839,868. Kopetz, H. Communication method and system for the transmission of time-driven and event-driven Ethernet messages. Granted Nov. 23, 2010.

[4] U.S. Pat. No. 7,349,512 Rausch et al. Clock synchronization in a distributed system. Granted Mar. 25, 2008.

[5] U.S. Pat. No. 7,912,094 Hall, et al. Self-checking pair-based master/follower clock synchronization. Granted Mar. 22, 2011.

[6] U.S. Pat. No. 8,089,991 Ungermann. Network and method for clock synchronization of clusters in a time triggered network. Granted Jan. 3, 2012.

[7] Eidson, J. C. *Measurement, Control and Communication Using IEEE* 1588, (Springer publishing house 2006)

[8] Kopetz, H. Real-Time Systems, *Design Principles for Distributed Embedded Applications*. Springer publishing house. 2011.

[9] SAE Standard AS6802 von TT Ethernet. URL: http://standards.sae.org/as6802

[10] IEEE 1588 *Standard for a Precision Clock Synchronization Protocol for Network Measurement and Control Systems*. URL: http://www.ieee1588.com/

What is claimed is:

1. A method for the reliable switching of synchronisation messages in a distributed computer system including a number of node computers performed by a switching unit including at least four Fault-Containment Units (FCUs) including an input system (EIN), a first switching system (VER1), a second switching system (VER2), and an output system (AUS), wherein the management of a transparent clock conforming to IEEE Standard 1588 is supported, the method comprising:

receiving a message arriving at the EIN from a transmitting node computer; forwarding the message in unmodified form from EIN to the VER1 and to the VER2, generating a timestamp for the arrival of the message in the VER1, modifying a Time Interval Correction (TIC) field within the message using the VER1 in order to provide the delay period of the message in VER1, re-calculating a Cyclic Redundancy Field (CRC) field of the modified message using the VER1 to make the message a closed message, forwarding the closed message from the VER1 to AUS, and generating a timestamp indicating an arrival of the message in the VER2, modifying a TIC field within the message using the VER2 in order to indicate the delay period of the message in VER2, and re-calculating a CRC field of the modified message using the VER2 to make the message a closed message, forwarding the closed message from the VER2 to the AUS, receiving the message from VER1 and the message from VER2 in the AUS, determining whether the content of the message delivered from VER1 matches the content of the message delivered from VER2 using the AUS, determining whether the interval between the moment of receipt of the message delivered from VER1 and the moment of receipt of the message delivered from VER2 is smaller than a first interval using the AUS, determining whether the absolute value of the difference of the delay values stored in the two TIC fields is smaller than a second interval using the AUS, and wherein the AUS selects one of interrupting the transmission of the message that is outbound via the addressed output ports and changing the outbound message in such a way that each message receiver identifies the incoming message as faulty in response to a determination that at least one of the interval being smaller than the first interval, the absolute value of the difference is smaller than the second interval, and the content of the message matches is negative.

2. The method according to claim 1, further comprising processing messages in the EIN and the AUS by the cut through method.

3. The method according to claim 1, further comprising shifting the processing of the message in the VER1 and the VER2 over time by one or more cycles.

4. The method according to claim 1, wherein a different presentation of data is used in each of the VER1 and the VER2.

5. The method according to claim 1, further comprising redundantly storing configuration data for the time-controlled transport of messages in both the VER1 and the VER2.

6. The method according to claim 1, further comprising securing data stored in the VER1 and the VER2 with fault-identifying codes.

7. The method according to claim 1, further comprising securing data stored in the VER1 and the VER2 with fault-correcting codes.

8. The method according to claim 5, the configuration data is loaded via a cryptographically secured protocol.

9. The method according to claim 1, wherein the VER1 and the VER2 use a same clock.

10. An apparatus for providing the reliable switching of synchronisation messages in a distributed computer system including a number of node computers wherein the apparatus comprises a switching unit including at least four Fault-Containment Units (FCUs) including an input system (EIN), a first switching system (VER1), a second switching system (VER2), and an output system (AUS), and wherein the management of a transparent clock conforming to IEEE Standard 1588 is supported, wherein:

the EIN is configured to:

receive a message arriving from a transmitting node computer, and forward the message in unmodified form to the VER1 and to the VER2;

the VER1 is configured to:

generate a timestamp for the arrival of the message in the VER1, modify a Time Interval Correction (TIC) field within the message in order to provide the delay period of the message in VER1, re-calculate a Cyclic Redundancy Field (CRC) field of the modified message to make the message a closed message, and forward the closed message to the AUS;

the VER2 is configured to:

generate a timestamp indicating an arrival of the message in the VER2, modify a TIC field within the message in order to indicate the delay period of the message in VER2, and re-calculate a CRC field of the modified message using the VER2 to make the message a closed message, and forward the closed message to the AUS;

the AUS is configured to:

receive the message from VER1 and the message from VER2, determine whether the content of the message delivered from VER1 matches the content of the message delivered from VER2, determine whether the interval between the moment of receipt of the message delivered from VER1 and the moment of receipt of the message delivered from VER2 is smaller than a first interval, determine whether the absolute value of the difference of the delay values stored in the two TIC fields is smaller than a second interval, and select one of interrupting the transmission of the message that is outbound via the addressed output ports and changing the outbound message in such a way that each message receiver identifies the incoming message as faulty in response to a determination that at least one of the interval being smaller than the first interval, the absolute value of the difference is smaller than the second interval, and the content of the message matches is negative.

11. The apparatus according to claim 10, wherein each of the EIN, the VER1, the VER2 and the AUS is provided on a different chip.

12. The apparatus according to claim 10, wherein the EIN, the VER1, the VER2 and the AUS are provided in two identical chips, and the replicated FCUs are synchronised at hardware level.

13. The apparatus according to claim 10, wherein the EIN, the VER1, the VER2 and the AUS are provided in an ASIC.

14. The apparatus according to claim 10, wherein the EIN, the VER1, the VER2 and the AUS are provided in an FPGA.

15. A distributed computer system an apparatus for providing reliable switching of synchronisation messages in a distributed computer system including a number of node computers wherein the apparatus comprises a switching unit including at least four Fault-Containment Units (FCUs) including an input system (EIN), a first switching system (VER1), a second switching system (VER2), and an output system (AUS), and wherein the management of a transparent clock conforming to IEEE Standard 1588 is supported, wherein:

the EIN is configured to:

receive a message arriving from a transmitting node computer, and forward the message in unmodified form to the VER1 and to the VER2;

the VER1 is configured to:

generate a timestamp for the arrival of the message in the VER1, modify a Time Interval Correction (TIC) field within the message in order to provide the delay period of the message in VER1, re-calculate a Cyclic Redundancy Field (CRC) field of the modified message to make the message a closed message, and forward the closed message to the AUS;

the VER2 is configured to:

generate a timestamp indicating an arrival of the message in the VER2, modify a TIC field within the message in order to indicate the delay period of the message in VER2, and re-calculate a CRC field of the modified message using the VER2 to make the message a closed message, and forward the closed message to the AUS;

the AUS is configured to:

receive the message from VER1 and the message from VER2, determine whether the content of the message delivered from VER1 matches the content of the message delivered from VER2, determine whether the interval between the moment of receipt of the message delivered from VER1 and the moment of receipt of the message delivered from VER2 is smaller than a first interval, determine whether the absolute value of the difference of the delay values stored in the two TIC fields is smaller than a second interval, and select one of interrupting the transmission of the message that is outbound via the addressed output ports and changing the outbound message in such a way that each message receiver identifies the incoming message as faulty in response to a determination that at least one of the interval being smaller than the first interval, the absolute value of the difference is smaller than the second interval, and the content of the message matches is negative.

* * * * *